(12) United States Patent
Miyata

(10) Patent No.: US 7,213,831 B2
(45) Date of Patent: *May 8, 2007

(54) HANDLE COVER, MOTORBIKE

(75) Inventor: Yasuhito Miyata, Shiga (JP)

(73) Assignee: Takata Corporation (JP)

( * ) Notice: Subject to any disclaimer, the term of this patent is extended or adjusted under 35 U.S.C. 154(b) by 255 days.

This patent is subject to a terminal disclaimer.

(21) Appl. No.: 10/826,014

(22) Filed: Apr. 16, 2004

(65) Prior Publication Data
US 2004/0207184 A1 Oct. 21, 2004

(30) Foreign Application Priority Data
Apr. 17, 2003 (JP) ............................. 2003-113042

(51) Int. Cl.
B60R 21/16 (2006.01)

(52) U.S. Cl. ................ 280/728.2; 280/728.3; 280/730.1; 280/743.1

(58) Field of Classification Search ............ 280/730.1, 280/728.3, 728.2, 728.1, 743.1
See application file for complete search history.

(56) References Cited

U.S. PATENT DOCUMENTS 5,938,231 A   8/1999  Yamazaki
6,099,028 A * 8/2000  Seifert ...................... 280/728.3
6,846,009 B2  1/2005  Kuroe et al.
2004/0207182 A1* 10/2004 Miyata ...................... 280/730.1
2004/0251664 A1* 12/2004 Miyata ...................... 280/730.1

FOREIGN PATENT DOCUMENTS

JP  2000-108974  4/2000
JP  2002-137777  5/2002

* cited by examiner

Primary Examiner—Eric Culbreth
(74) Attorney, Agent, or Firm—Fitch, Even, Tabin & Flannery

(57) ABSTRACT

A technology for constructing an airbag in which protection of the occupant may be thoroughly assured in case of accident of a motorbike and a technology relating thereto are provided. An airbag apparatus including an airbag which is deployed and expanded in an occupant crush protection area formed in front of an occupant in case of front collision and a cover body is provided on a motorcycle as a motorbike. The cover body can cover and uncover a handle and the airbag, and is torn at a thinned portion when the second component part of the airbag is deployed and expanded, and thus the second component part is uncovered.

18 Claims, 7 Drawing Sheets

HANDLE COVER, MOTORBIKE

FIELD OF THE INVENTION

The present invention relates to a technology for constructing a motorbike provided with an airbag apparatus.

BACKGROUND OF THE INVENTION

Hitherto, a various technologies for protecting an occupant by providing an airbag apparatus on a motorcycle are known. For example, in a motorcycle, a technology in which an airbag stored in a case mounted to a vehicle body frame is deployed and expanded by expansion gas in case of a front collision, whereby restraining the occupant, is publicly known, for example, see Japanese Unexamined Patent Application Publication No. 2002-137777. In this technology, although a possibility of securing a wide protective area for the airbag is presented, in a case of mounting the airbag apparatus on the vehicle body which is opened on all four sides as a motorbike, development of a technology which is further effective for assuring restraint of the occupant by the airbag is highly demanded.

SUMMARY OF THE INVENTION

In view of such point, it is an object of the present invention to provide a technology for constructing an airbag in which protection of the occupant may be thoroughly assured in case of accident of the motorbike, and a technology relating thereto.

In order to achieve the above-described object, the invention according to several forms is constructed. The invention described in the respective forms may be applied to various motorbikes on which an airbag apparatus is mounted. In this specification, the term "motorbike" widely includes a saddle-type vehicle, that is, a vehicle of the type in which the occupant sits astride on a seat. For example, a motorcycle of the type having a fuel tank provided in front of an occupant's seat and a motorcycle of the scooter type having a space between the occupant's seat and a handle-supporting head pipe are both included. In addition to the motorcycles, a vehicle including three or more traveling wheels and being constructed so that the occupant is seated astride (for example, a three-wheeled motorbike used for delivering pizza, or a three-or four-wheeled baggy type motorcycle having a road ability), and a vehicle traveling with a sleigh or an endless track belt and being so that the occupant is seated astride, such as a snowmobile, are also widely included in the above-described "motorbike".

In the invention according to a first form, an airbag apparatus includes an airbag, and the airbag is adapted to be supplied with expansion gas therein in case of a front collision of the motorbike. Typically, the construction in which the airbag and means for inflating the airbag, for example, an inflator or the like are stored in a retainer as a storing member, and expansion gas is supplied into the airbag by the operation of the inflator. Accordingly, the airbag is deployed and expanded while projecting toward an occupant crush protection area defined in front of the occupant.

A handle cover of the present invention has such construction that can cover or uncover a handle unit and the airbag of the motorbike in various motorbikes on which the airbag apparatus is mounted. Specifically, the handle cover of the present invention is characterized in that the construction originally used for covering the handle unit is used also as an airbag cover for covering the airbag. Such construction can eliminate the airbag cover and thus is effective especially for providing a compact airbag apparatus.

The term "handle unit" in the present invention represents not only the handle itself as a matter of course, but also various members such as a bracket attached to the handle, or the construction in which these various members and the handle are combined. The state of "covering the airbag" in the present invention means to cover at least the airbag, and includes not only the state in which the entire portion or part of the airbag is covered by the handle cover, but also, for example, the state in which the component parts of the airbag apparatus including the airbag or the entire airbag apparatus are covered by the handle cover.

The handle cover according to the present invention includes an allowable area for allowing uncovering of the airbag when the airbag is deployed and expanded. The term "allowable area" in the present invention is intended to widely include an area having the construction for allowing the airbag to be uncovered, and typically, an area having the construction that can be torn or pushed away when a force of deployment and expansion applied by the airbag of the airbag body is exerted thereon. More specifically, such construction includes a construction in which a part to be torn, which is thinner than other portions, is formed on the cover body as the allowable area so that the part to be torn (allowable area) is torn to uncover the airbag upon deployment and expansion of the airbag, and a construction in which the allowable area is formed of overlapping portion of the component parts of the cover body so that the overlapped portion of the allowable area is released to uncover the airbag upon deployment and expansion of the airbag.

The construction in which the handle cover is also used as the cover for the airbag is typically achieved by mounting the airbag to the handle unit. Generally, the motorbike has a construction in which the handle unit opposes (faces) the occupant crush protection area formed in front of the occupant, and thus the airbag can be projected stably and reliably toward the occupant crush protection area by mounting the airbag to the handle unit in such construction. The construction in which the airbag is mounted to the handle unit is superior in assemblability since the positioning of the airbag is easy.

In addition, by mounting the airbag to the handle unit by mounting means such as rivets, bolts, or clips, the completely deployed and expanded airbag can be prevented from being displaced when constraining the occupant. Furthermore, by making the rigid handle unit serve as a pressure receiving portion of the completely deployed and expanded airbag, a load exerted from the occupant to the airbag can be received positively by the handle unit. Generally, the handle unit of the motorbike may be disposed at a position which is likely to block deployment and expansion of the airbag. However, by employing the construction in which the airbag is mounted to the handle unit itself, likeliness of blockage of deployment and expansion of the airbag by the handle unit may be reduced. In addition, by mounting the airbag over a wide range along the length of the handle unit which extends in an elongated manner, directivity of projection of the airbag may be enhanced, which is effective for controlling the direction of projection of the airbag. In this construction, protection of the occupant may be thoroughly assured in case of accident.

Here, it is preferable that the handle cover according to the first form includes a thinned portion as the allowable area as described in a second form.

The "thinned portion" in the present invention is defined as a portion which is relatively thin with respect to other portions of the cover body (part to be torn). The form of the thinned portion includes a form in which the thinned part to be torn is linearly formed, a form in which the part to be torn is formed in a dotted manner, and a form in which the part to be torn is formed in a sheet shape. Typically, the construction in which a tear line formed of linear part to be torn is provided on the cover body is employed. The thinned portion is a portion which takes part in uncovering the airbag, and is adapted to be torn in response to reception of the force of deployment and expansion exerted from the airbag. Accordingly, the airbag is uncovered by the action of the thinned portion when the airbag is deployed and expanded, and thus the airbag is allowed to be deployed and expanded toward the outside of the handle cover. Such construction can realize a compact construction of the handle cover which is effective for covering or uncovering the airbag.

It is preferable that the handle cover according to the first form includes the allowable area constructed of an overlapped portion in which a plurality of cover configuration strips are overlapped partly with each other as described in a third form. In this handle cover, the overlapping is released in such a manner that the overlapped portion is pushed away in response to the reception of the force of development and expansion exerted, for example, from the airbag when the airbag is deployed and expanded, and thus the airbag covered by the handle cover is uncovered. Consequently, when the airbag is deployed and expanded, deployment and expansion of the airbag toward the outside of the handle cover is allowed. Such construction can realize a compact construction of the handle cover, which is effective for covering or uncovering the airbag.

The motorbike according to a fourth form is specified as a motorbike provided with the handle cover in any one of the previously described forms. Accordingly, the motorbike in which protection of the occupant may be thoroughly assured in case of accident is provided.

DETAILED DESCRIPTION OF THE PREFERRED EMBODIMENTS

Figure 1:
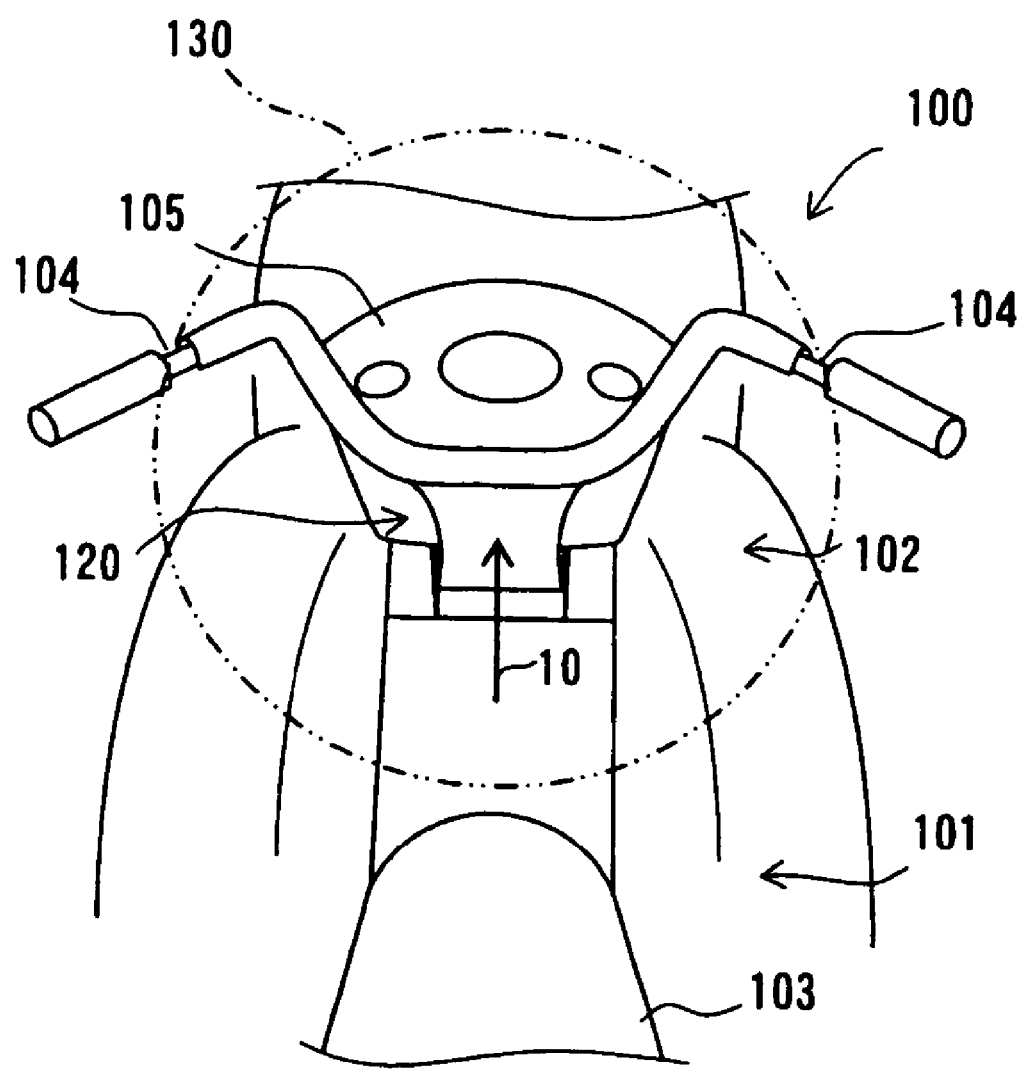
FIG. 1 is a drawing of a motorcycle 100 of a scooter type according to an embodiment of the present invention viewed from an occupant, showing a state in which an airbag apparatus 120 is mounted to the motorcycle 100.
Figure 2:
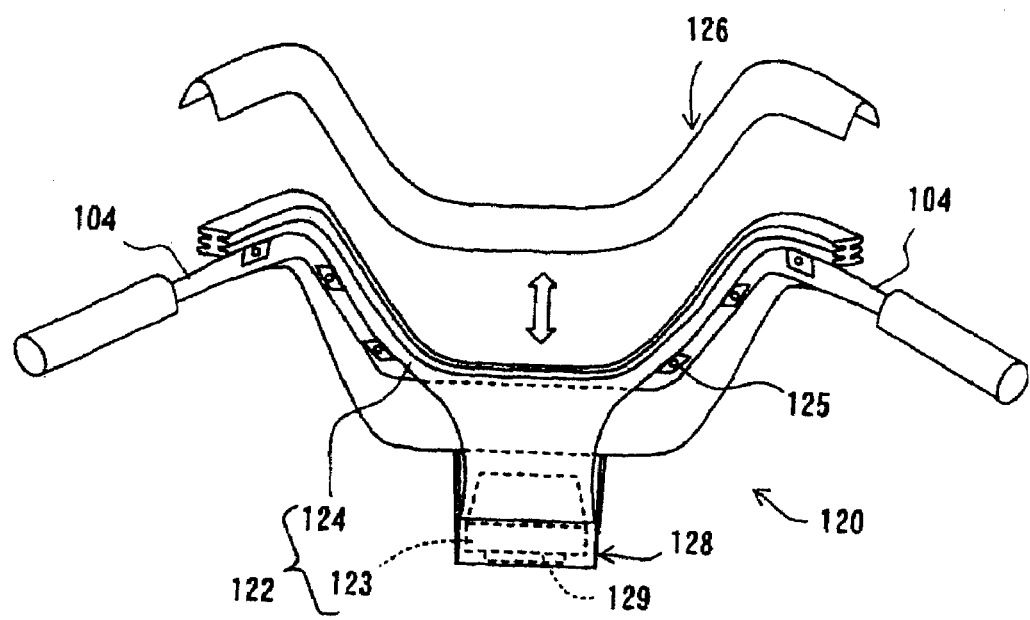
FIG. 2 is a drawing showing the construction of the airbag apparatus 120 in FIG. 1.
Figure 3:
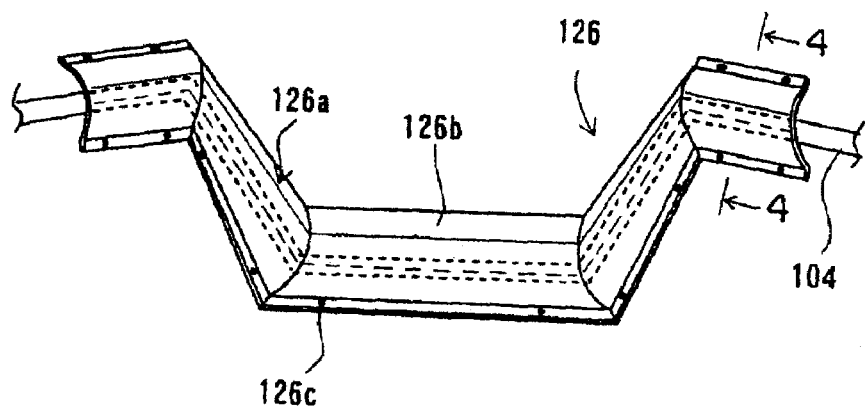
FIG. 3 is a drawing showing the construction of a cover body 126 in FIG. 2.
Figure 4:
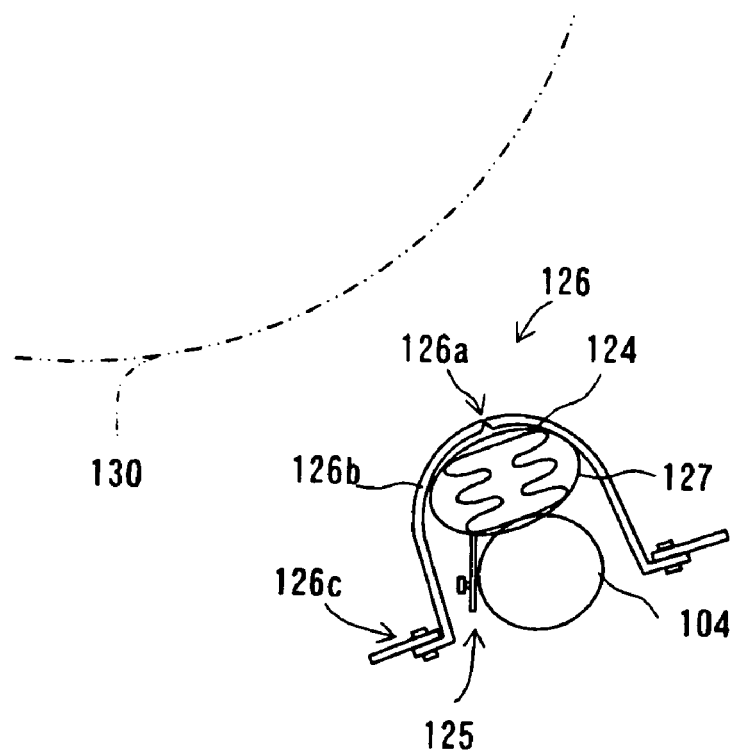
FIG. 4 is a cross-sectional view taken along the line 4—4 in FIG. 3.
Figure 5:
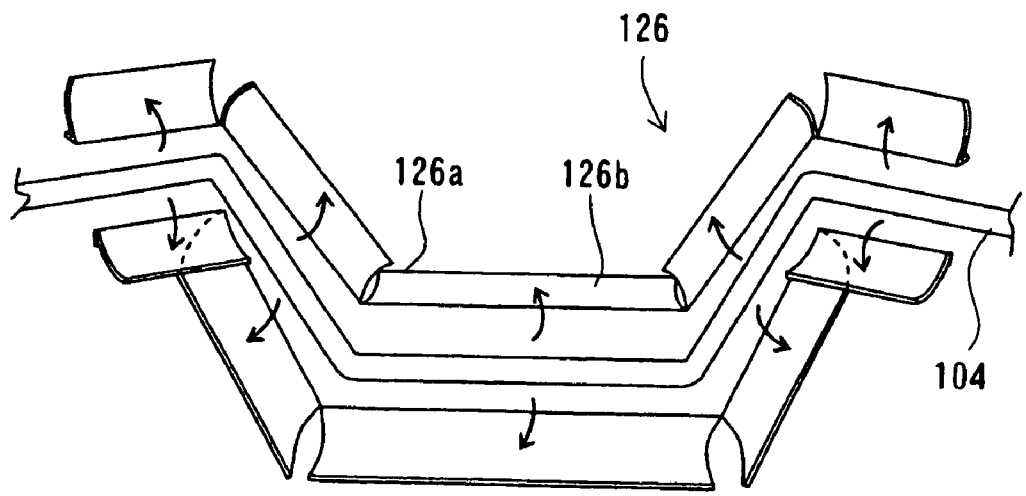
FIG. 5 is a drawing showing a state in which the cover body 126 is torn at a thinned portion 126a in FIG. 4.
Figure 6:
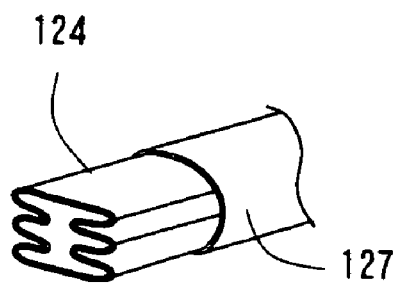
FIG. 6 is a fragmentary, enlarged perspective view of a portion of the airbag and protective fabric extending thereabout.

Referring now to drawings, an embodiment of the present invention will be described in detail. FIG. 1 is a drawing of a motorcycle 100 of a scooter type according to the embodiment of the present invention viewed from the occupant, showing a state in which an airbag apparatus 120 is mounted to the motorcycle 100. FIG. 2 is a drawing showing the construction of the airbag apparatus 120 in FIG. 1. FIG. 3 is a drawing showing the construction of a cover body 126 in FIG. 2. FIG. 4 is a cross-sectional view taken along the line 4—4 in FIG. 3. FIG. 5 is a drawing showing a state in which the cover body 126 is torn at a thinned portion 126a in FIG. 2. FIG. 6 is an enlarged partial view of an airbag 122 in FIG. 2. The motorcycle 100 in the present embodiment corresponds to an example of the "motorbike" in the present invention.

As shown in FIG. 1, the motorcycle 100 is constructed as a scooter mainly including a vehicle body component 101 including an engine and a main frame, a seat 103 on which the occupant can be seated astride, a handle 104, and front and rear wheels (not shown).

An area in front of the occupant, which corresponds the portion above the vehicle component 101 of the motorcycle 100 is defined as an occupant crush protection area 130 which functions when a front collision of the motorcycle 100 is encountered. In the present embodiment, the term "front collision" widely includes a state in which the motorcycle 100 collides at its front with an object (not specifically shown in the drawing as a matter of convenience) in front. The term "occupant crush protection area 130" in the present embodiment is defined as a space extending in a direction 10 toward the front of the motorcycle 100, the direction 10 being a direction in which the occupant is to be moved by a kinetic energy in case of front collision, for restraining and protecting the occupant from being thrown toward the front of the motorcycle 100 when the occupant is about to be moved toward the front of the motorcycle 100 by a kinetic energy upon the front collision.

Disposed on a front portion 102 on the front portion of the vehicle body of the vehicle body component 101 are the handle 104, the airbag apparatus 120, and a panel 105 including various indicators and switches. Especially, the airbag apparatus 120 is attached to the handle 104, and arranged so as to face toward the occupant crush protection area 130 described above. In other words, in the present embodiment, the airbag apparatus 120 is disposed in such a manner that the direction of projection (deployment and expansion) of the airbag 122, which will be described later, is oriented toward the front of the occupant.

As shown in FIG. 2, the airbag apparatus 120 is constructed mainly of the airbag 122, a retainer 128 for storing the airbag 122, an inflator 129 for supplying expansion gas to make the airbag 122 deployed and expanded from the retainer 128, a mounting device 125, and the cover body 126.

The airbag 122 of the present embodiment includes a first component part 123 to be stored in the interior of the retainer 128, and a second component part 124 to be disposed outside of the retainer 128. The first component part 123 is stored in the retainer 128, for example, in a state of being folded into a roll.

On the other hand, the second component part 124 is mounted to the elongated handle 104 along the length thereof by means of the mounting device 125 on the outside of the retainer 128. In the present embodiment, the second component part 124, which is a part of the airbag 122, is disposed outside of the retainer 128, and the second component part 124 is mounted to the handle 104, which is the vehicle body component. The handle 104 corresponds to the "handle unit" of the present invention. The second component part 124 may be arranged in a partly deployed (drawn) manner from the retainer 128, or may be arranged outside of the retainer 128 in advance and assembled thereto.

The second component part 124 is mounted to the upper portion of the handle 104 by means of the mounting device 125. The mounting device 125 includes rivets, bolts, and clips, and may be selected as needed. The cover body 126 has a construction corresponding to the shape of the handle 104 to which the second component part 124 is mounted, and is adapted to cover the second component part 124 as a part of the airbag 122 so as to include the entire handle 104. The cover body 126 corresponds to the "handle cover" in the present invention.

As shown in FIG. 3 and FIG. 4, the cover body 126 is adapted to be fixed to the vehicle body by means of a cover mounting device 126c.

The cover body 126 includes the thinned portion 126a (portion to be torn) which is relatively thin and a thick portion 126b which is relatively thick on the main body of the cover. The thinned portion 126a forms a linear (line-shaped) tear line, and this portion takes part in tearing (breaking, opening) of the main body of the cover. In other words, the thickness of the thinned portion 126a is determined based on a force of deployment and expansion exerted on the cover body 126 from the second component part 124. Therefore, the cover body 126 is adapted to be torn (broken, opened) along the tear line formed of the thinned portion 126a in response to reception of the force of deployment and expansion upon deployment and expansion of the second component part 124. For example, as shown in FIG. 5, upon deployment and expansion of the second component part 124, the cover body 126 is torn into a plurality of (ten in FIG. 5) configuration strips. The thinned portion 126a constitutes the "allowable area" in the present invention.

Here, the second component part 124 to be mounted along the handle 104 is preferably covered in its periphery by a protective fabric 127 after being folded in a predetermined form, for example, in an accordion form, as shown in FIG. 6. The protective fabric 127 employed here has a construction that is capable of maintaining the folded state of the second component part 124 and, in addition, that allows its deployment and expansion when the second component part 124 is deployed and expanded. For example, a material that does not impair deployment and expansion of the second component part 124 and is easily broken, for example a thin fabric, may be used for constructing the protective fabric 127. In this construction, the folded state of the second component part 124 is prevented from being deformed, and smooth deployment and expansion of the second component part 124 are ensured.

Figure 7:
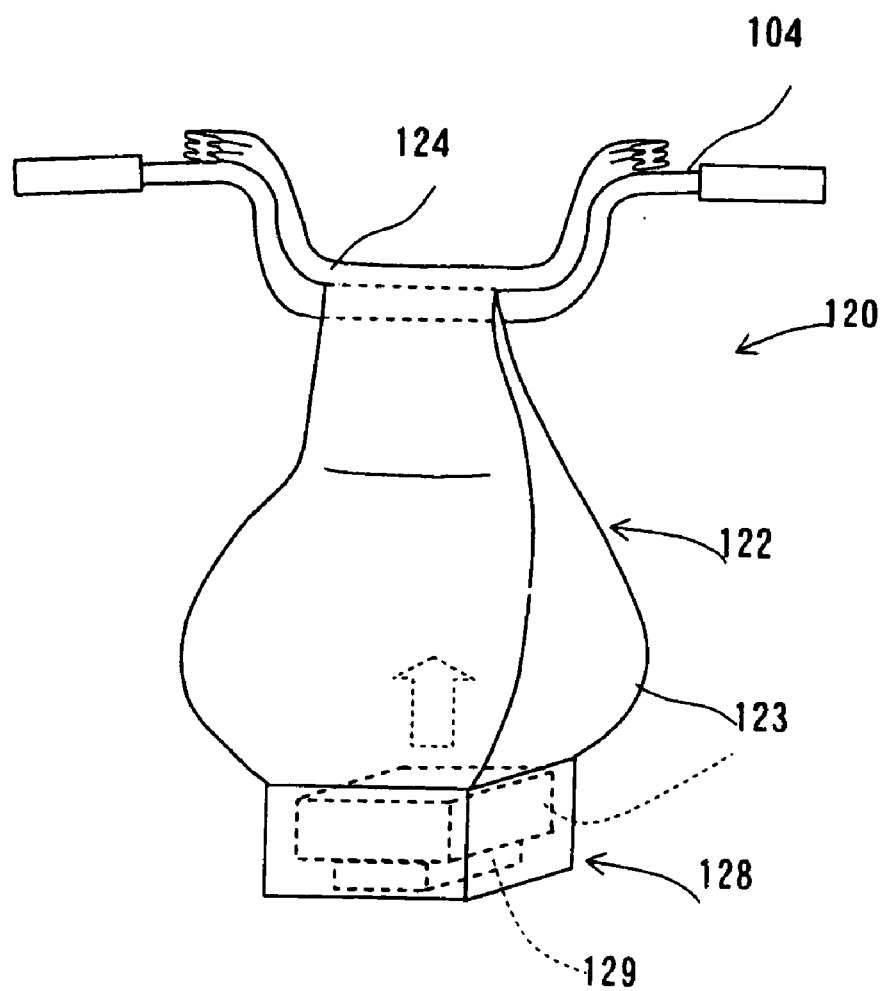
FIG. 7 is a schematic drawing showing the initial stage of deployment of the airbag apparatus 120.
Figure 8:
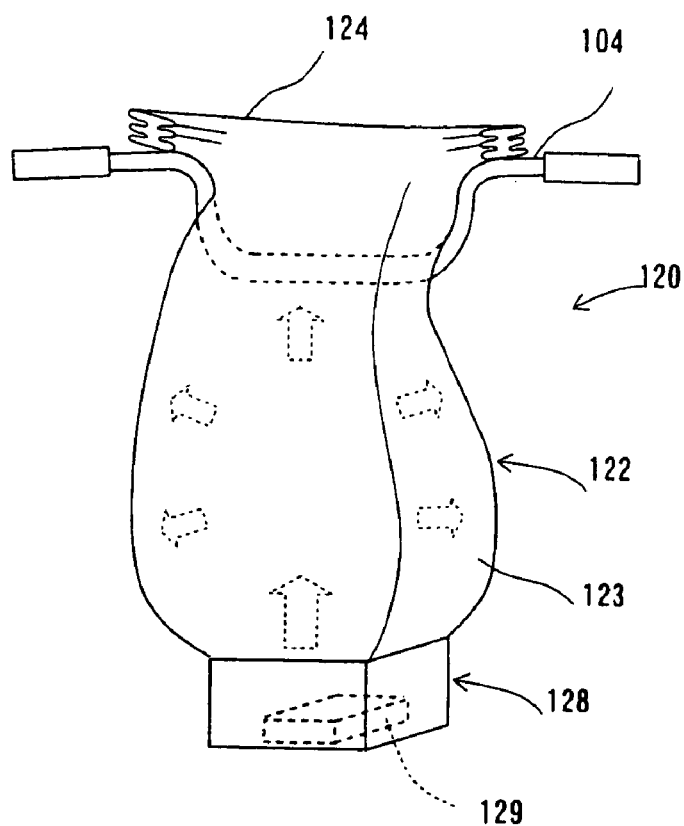
FIG. 8 is a schematic drawing showing the airbag apparatus 120 in the deploying stage.
Figure 9:
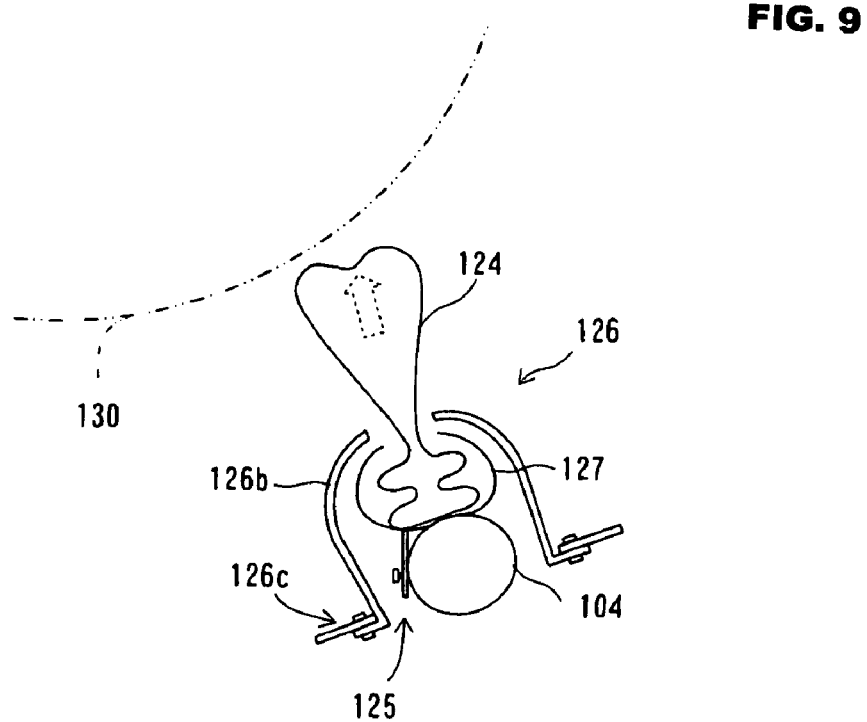
FIG. 9 is a partial cross-sectional view of FIG. 8.
Figure 10:
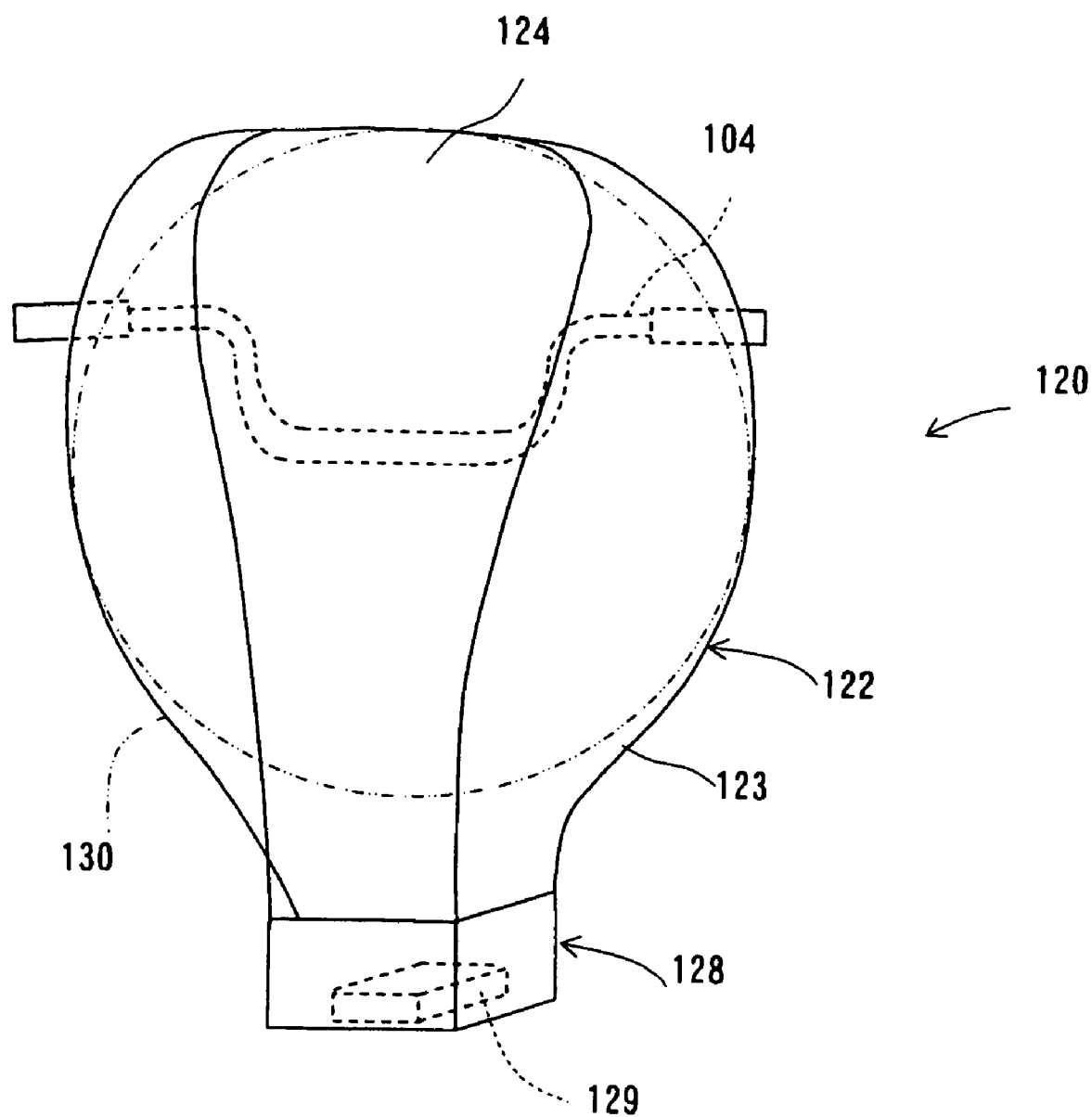
FIG. 10 is a schematic drawing showing the state of the airbag apparatus 120 when the deployment is completed.

Subsequently, the operation of the motorcycle 100 and the airbag apparatus 120 according to the present embodiment constructed and manufactured as described above will be described referring to FIGS. 1 to 6 as well as FIGS. 7 to 10. FIG. 7 is a schematic drawing showing the initial stage of deployment of the airbag apparatus 120. FIG. 8 is a schematic drawing showing the airbag apparatus 120 in the deploying stage. FIG. 9 is a partial cross-sectional view of FIG. 8. FIG. 10 is a schematic drawing showing the state of the airbag apparatus 120 when the deployment is completed.

When the motorcycle 100 on which the occupant rides is involved in collide accident in the direction of travel, the occupant is about to move (to be thrown) toward the front (the direction indicated by the arrow 10) of the motorcycle 100 as shown in FIG. 1. In the present embodiment, the airbag apparatus 120 is activated upon detection of front collision, and projection (deployment) of the airbag 122 from the airbag apparatus 120 toward the occupant crush protection area 130 starts. When supply of expansion gas from the inflator 129, as the expansion gas supplying means, to the interior of the airbag 122 is initiated, deployment and expansion of the airbag 122 starts. The state of the airbag apparatus 120 in the initial stage of deployment is shown, for example, in FIG. 7.

As shown in FIG. 7, in the initial stage of deployment of the airbag apparatus 120, the first component part 123 of the airbag 122 is deployed and expanded while jumping out from the retainer 128. The state in which the airbag 122 is expanded while being deployed in this manner corresponds to "deployment and expansion" in the present invention. In this state, the second component part 124 disposed along the handle 104 is covered by the protective fabric 127 and the state of being stored in the cover body 126 is maintained, for example, as shown in FIG. 4.

In addition, a state in which supply of expansion gas to the airbag 122 is continued and thus deployment and expansion of the airbag 122 is progressed is shown, for example, in FIG. 8 and FIG. 9.

As shown in FIG. 8, in the developing stage of the airbag apparatus 120, while development and expansion of the first component part 123 of the airbag 122 are further progressed and the area of expansion is expanded, development and expansion of the second component part 124 starts. In this state, the second component part 124 mounted to the handle 104 is expanded, for example, as shown in FIG. 9. At this time, the protective fabric 127 is broken by the force of deployment and expansion of the second component part 124. The cover body 126 is torn at the thinned portion 126a by the force of deployment and expansion of the second component part 124, and hence the second component part 124 covered by the cover body 126 is uncovered. The uncovered second component part 124 is allowed to deploy and expand toward the outside of the cover body 126, and projects toward the occupant crush protection area 130. This state correspond to the state in which "the cover body is torn at the thinned portion when the airbag is deployed and expanded, and thus the airbag is uncovered, and the airbag is allowed to be deployed and expanded toward the outside of the handle cover".

Therefore, upon completion of deployment of the airbag apparatus 120, for example, as shown in FIG. 10, the entire airbag 122 including the first component part 123 and the second component part 124 is deployed and expanded in the occupant crush protection area 130. In the state in which the airbag 122 is completely deployed and extended, the occupant crush protection area 130 is engorged with the expanded airbag 122, and thus the occupant who is about to move toward the front of the vehicle body (in the direction indicated by the arrow 10 in FIG. 1) by a kinetic energy upon collision is reliably maintained and restrained in the occupant crush protection area 130, thereby preventing him/her from being thrown toward the front of the motorcycle 100.

As described above, according to the airbag apparatus 120 of the present embodiment, by providing the cover body 126 with both the function as the cover for the airbag 122 and the function as the cover for the handle 124, a rational airbag construction technology may be provided. Specifically, the cover for the airbag or the cover for the handle may be eliminated, which is effective for providing the compact airbag apparatus above all. Since the cover body 126 having the thinned portion 126 is employed, the cover which is effective for covering and uncovering the airbag 122 can be constructed compactly.

According to the airbag apparatus 120 of the present embodiment, by mounting the second component part 124 to the handle 104, such possibility that deployment and expansion of the airbag 122 are blocked by being caught on projected portions of the handle 104 may be reduced. Generally, the handle of the motorbike is often disposed at the position that may block deployment and expansion of the airbag. However, the present embodiment, in which the second component part 124 is attached to the handle 104 itself, is specifically effective for reducing the possibility of blockage of deployment and expansion of the airbag 122 by the handle 104. Therefore, protection of the occupant may be thoroughly assured in case of accident.

Such construction of the airbag apparatus 120 according to the present embodiment is effective for controlling the direction of projection of the airbag 122, since the directivity of projection of the second component part 124 of the airbag 122 may be enhanced. In other words, in the construction in the related art, in which the entire airbag is stored in the storage member (retainer), it is necessary to devise the folding form of the airbag in order to allow the airbag to project in the proper direction. However, according to the present embodiment, the airbag 122 can be projected stably and reliably toward the occupant crush protection area 130. Specifically, since the construction in which the second component part 124 is mounted over a wide range along the length of the elongated handle 104 is employed, this effect is further enhanced.

In addition, according to the present embodiment, by arranging the second component part 124 of the airbag 122 outside of the retainer 128, the time period required until the entire airbag 122 is deployed and expanded completely may be reduced, which enables improvement ability to restrain the occupant. Furthermore, such construction also enables downsizing of the retainer 128. Specifically in the vehicle body opened on all four sides as the motorcycle 100, the storage member is generally upsized from such demand for reliable restraint of the occupant by means of a larger airbag. However, according to the present embodiment, the retainer 128 as the storage member may be downsized while securing the ability of the airbag 122 to restrain the occupant. This is effective to improve the appearance of the motorcycle 100 on which the airbag apparatus 120 is mounted. In other words, especially in the vehicle body opened on all four sides of the occupant as the motorcycle 100, an airbag of a large size must be used, and thus the storage member is generally upsized. However, according to the present embodiment, such problem may be solved.

In the present embodiment, since the construction in which the second component part 124 is attached to the handle 104 by means of the mounting device 125 is employed, the position of the airbag 122 which is completed in deployment and expansion is hardly displaced when restraining the occupant and, in addition, since the rigid handle 104 serves as a pressure receiving portion of the airbag 122, the load exerted to the airbag 122 from the occupant can reliably be received by the handle 104.

The present invention is not limited to the embodiment described above, and various applications and modification are considerable. For example, the following modes in which the embodiment described above is applied may be implemented.

Figure 11:
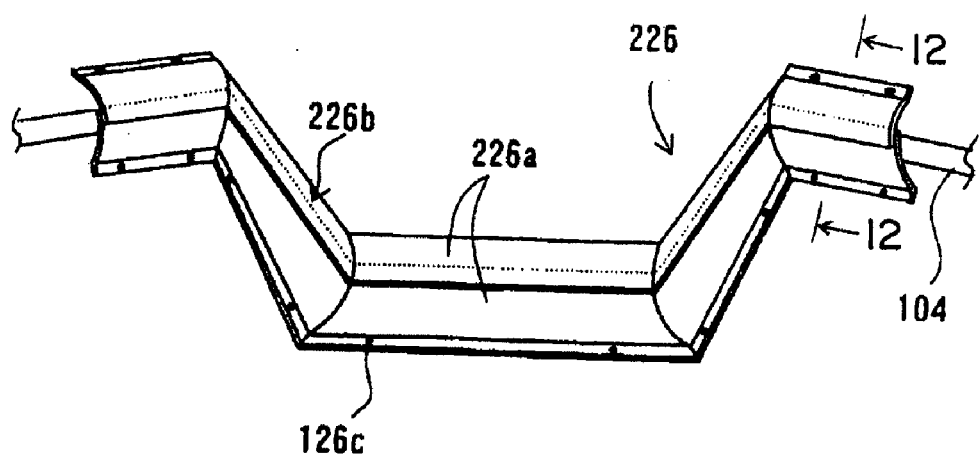
FIG. 11 is a drawing showing the construction of a cover body according to another embodiment.
Figure 12:
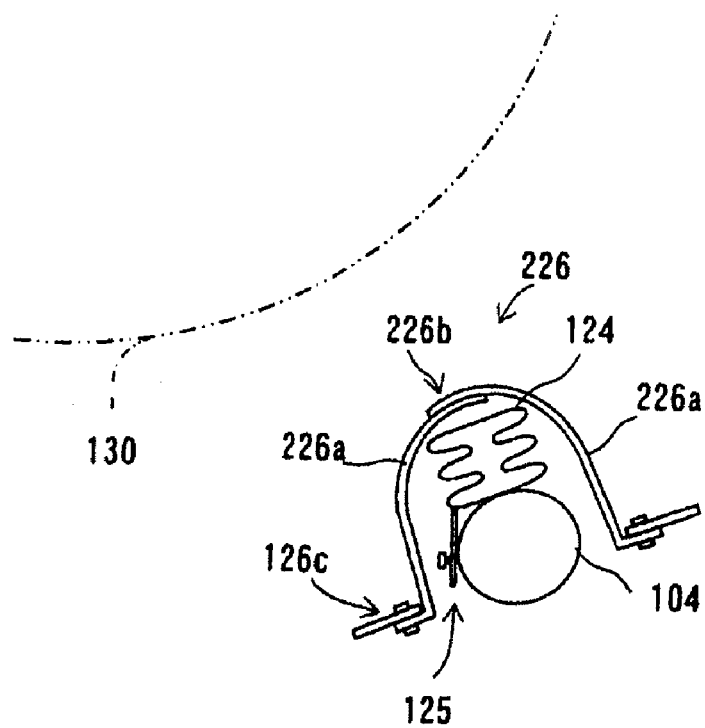
FIG. 12 is a cross-sectional view taken along the line 12—12 in FIG. 11.

Although the cover body 126 which is torn at the thinned portion 126*a* when the airbag 122 is deployed and expanded has been described in the above-described embodiment, a cover body 226 having a construction shown in FIG. 11 and FIG. 12, for example, may be employed. In these drawings, the identical parts to those in FIG. 3 and FIG. 4 are represented by the identical reference numerals. The cover body 226 corresponds to the "handle cover" in the present invention as in the case of the cover body 126 having the construction described above.

As shown in FIG. 11 and FIG. 12, the cover body 226 is constructed of a plurality of cover configuration strips 226*a* in advance, and the plurality of cover configuration strips 226*a* are partly overlapped, so that the overlapped portions (lapped portions) 226*b* are formed. The overlapped portions 226*b* constitute the "allowable areas" in the present invention. In the cover body 226 of such construction, overlapping of the cover configuration strips 226*a* at the overlapped portion 226*b* is released by a force received when the second component part 124 is deployed and expanded, and thus the second component part 124 is uncovered. The uncovered second component part 124 is allowed to deploy and expand toward the outside of the cover body 126, and projects toward the occupant crash protection area 130. This state corresponds to the state in which "overlapping at the overlapped portion is released when the airbag is deployed and expanded, and thus the airbag is uncovered". Accordingly, deployment and expansion of the second component part 124 is allowed, and the entire airbag 122 is deployed and expanded at the occupant crash protection area 130. The size of the overlapped portion 226*b* (overlapped margin) may be determined as appropriate based on a force of deployment and expansion exerted to the body cover 126 by the second component part 124.

Since the appearance of deployment and expansion of the airbag 122 covered by the cover body 226 is almost the same as the appearance shown in FIG. 8 to FIG. 10, the detailed description will be omitted. In the case in which the cover body 226 of such construction is employed as well, the same effects as in the case where the cover body 126 of the above-described embodiment is employed are achieved.

Although the cover body 126 in which the thinned portion 126*a* forms a linear (line-shaped) tear line has been described in the embodiment described above, the shape of the thinned portion 126*a* may be modified in various manners as needed. For example, the portion to be torn in thinned state formed in a dotted manner, the portion to be torn formed in a dotted or a linear manner and closed, and the portion to be torn formed into a sheet shape maybe used as the thinned portion.

Although the construction in which the second component part 124 as part of the airbag 122 is covered by the cover body 126 or the cover body 226 has been described in the embodiment described above, the construction in which the entire air bag apparatus 120 including the entire airbag 122 or the airbag 122 is covered by the cover body 126 or the cover body 226 may be employed.

Although the scooter type motorcycle 100 has been described in the embodiment described above, the present invention may also be applied to other types of motorbike.

According to the present invention, a technology for constructing an airbag in which protection of the occupant may be thoroughly assured in case of accident of the motorbike and a technology relating thereto are provided.

What is claimed is:

1. An airbag apparatus in combination with a motorcycle including a handlebar, the combination comprising:
an airbag including at least a portion thereof that is mounted to the handlebar;
a handlebar cover that extends over the handlebar and the airbag portion; and
a separable portion of the handlebar cover at which the handlebar cover opens upon deployment of the airbag,
wherein the airbag includes another portion mounted to a location of the motorcycle other than at the handlebar.

2. The combination of claim 1 wherein the handlebar cover includes a cover body and the separable portion comprises a thinned portion of the cover body which is torn open upon airbag deployment.

3. The combination of claim 1 wherein the separable portion comprises overlapping ends of material of the handlebar cover.

4. The combination of claim 3 wherein the handlebar cover comprises a plurality of strip portions of the handlebar cover material with a plurality of pairs of material strip portions extending along the handlebar so that there are a plurality of the overlapping ends portions of cover material.

5. The combination of claim 1 wherein the airbag portion is folded and connected to the handlebar to extend therealong.

6. The combination of claim 5 wherein the folded airbag portion extends between the handlebar and the separable portion of the handlebar cover.

7. The combination of claim 5 wherein the airbag portion has an accordion configuration as folded prior to deployment.

8. An airbag apparatus in combination with a motorcycle including a handlebar, the combination comprising:
an airbag including at least a portion thereof that is mounted to the handlebar;
a handlebar cover that extends over the handlebar and the airbag portion; and
a separable portion of the handlebar cover at which the handlebar cover opens upon deployment of the airbag,
a retainer housing having an interior and being mounted off of the handlebar; and
the airbag includes another portion mounted in the interior of the retainer housing and the airbag portion mounted to the handlebar is external of the retainer housing prior to airbag deployment.

9. A motorcycle comprising:
a seat for a driver;
a handlebar forwardly of the seat;
a cover for the handlebar;
an airbag for being deployed forwardly of the seat;
a portion of the airbag mounted to the handlebar;
another portion of the airbag mounted to a motorcycle location that is off of the handlebar; and
a predetermined portion of the cover that has a predetermined configuration prior to airbag deployment and shifts to a different configuration upon airbag deployment to allow the airbag to deploy and be inflated forwardly of the seat.

10. The motorcycle of claim 9 wherein the airbag portion is mounted between the handlebar and the cover.

11. The motorcycle of claim 10 wherein the airbag portion and the handlebar include fasteners therebetween for connecting the airbag portion to the handlebar.

12. The motorcycle of claim 9 wherein the cover portion comprises a separable portion so the cover opens at the separable portion during airbag deployment.

13. The motorcycle of claim 12 wherein the separable portion comprises one of a thinned material portion that is thinner than a thick portion of the cover, and overlapping material end portions.

14. The motorcycle of claim 12 wherein the separable portion is configured to extend in one of a linear configuration, and a dotted configuration.

15. A motorcycle comprising:
a seat for a driver;
a handlebar forwardly of the seat;
a cover for the handlebar;
an airbag for being deployed forwardly of the seat; and
a predetermined portion of the cover that has a predetermined configuration prior to airbag deployment and shifts to a different configuration upon airbag deployment to allow the airbag to deploy and be inflated forwardly of the seat,
wherein the airbag includes a retainer therefor generally mounted in an area lower than the handlebar.

16. The motorcycle of claim 15 wherein the airbag includes an upper portion mounted to the handlebar under the cover therefor external of the retainer, and a lower portion mounted in the retainer.

17. The motorcycle of claim 16 wherein the airbag upper portion is accordion folded.

18. The motorcycle of claim 16 wherein the airbag upper portion is folded to extend along the handlebar, and includes a protective fabric for keeping the airbag upper portion folded until airbag deployment.

* * * * *